Patented July 3, 1934

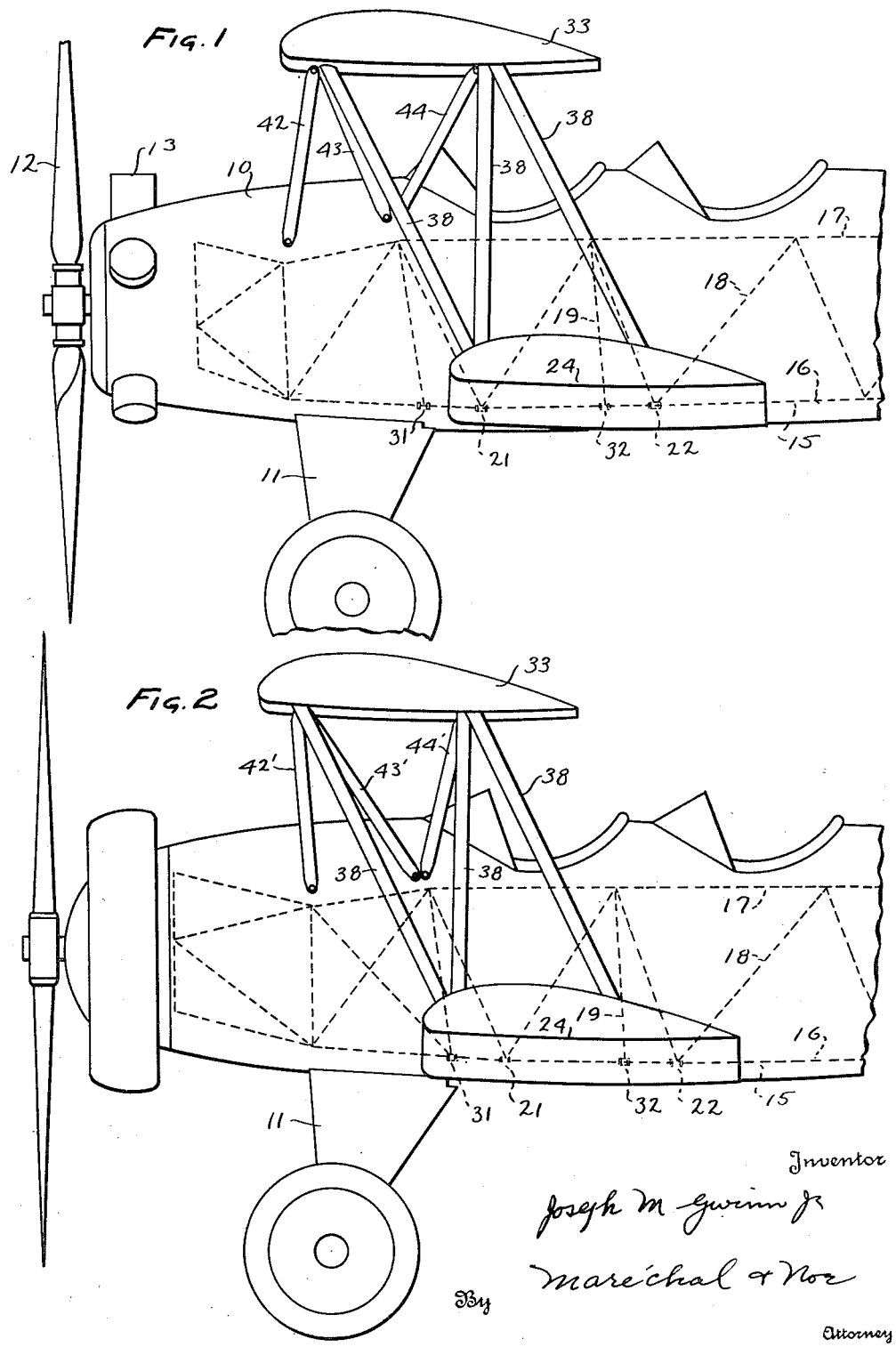

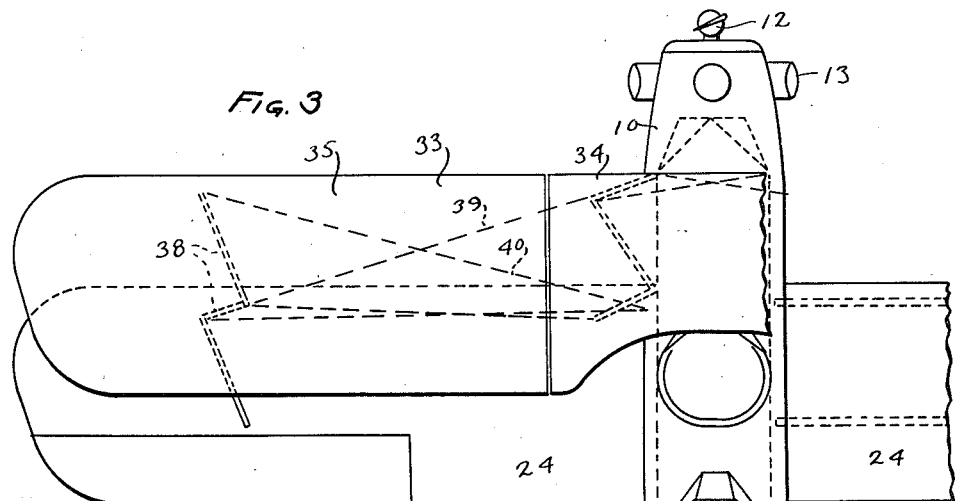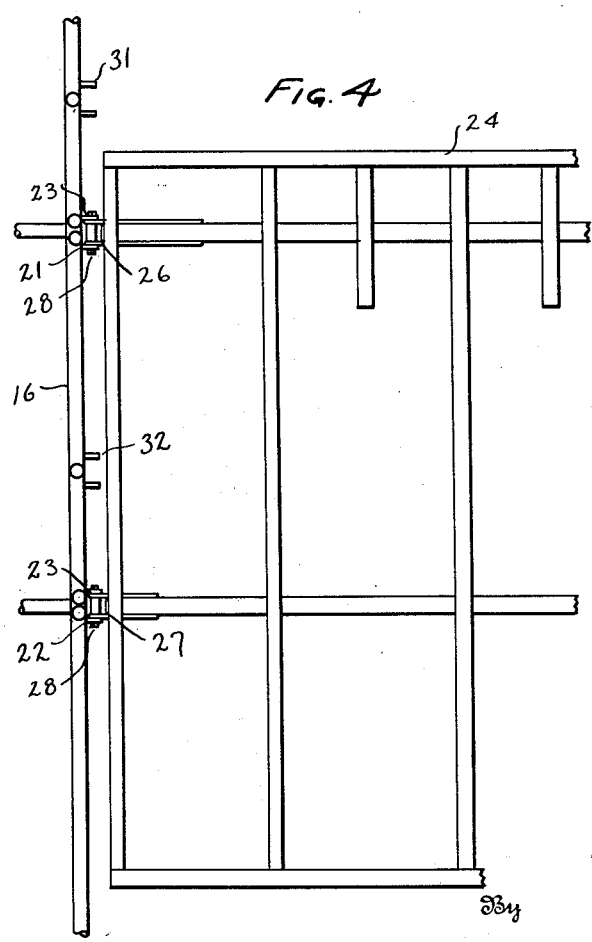

1,965,185

UNITED STATES PATENT OFFICE 1,965,185

AIRCRAFT

Joseph M. Gwinn, Jr., Buffalo, N. Y., assignor to Consolidated Aircraft Corporation, Buffalo, N. Y., a corporation of Delaware Application December 12, 1932, Serial No. 646,806

6 Claims. (Cl. 244—12)

This invention relates to aircraft and more particularly to the arrangement of aircraft sustaining planes.

One object of the invention is the provision of an aircraft having provision for securing a sustaining plane in a plurality of predetermined fixed positions on the aircraft fuselage.

Another object of the invention is the provision of an airplane embodying a fuselage having a plurality of pairs of anchorages, the anchorages of each pair being spaced apart a distance corresponding to the distance between the beams of the wings which are selectively securable to any desired pair of fuselage anchorages, providing for the fixed support of a wing in a plurality of different positions with respect to the fuselage.

Other objects and advantages of the invention will be apparent from the following description, the appended claims, and the accompanying drawings, in which—

Fig. 1 is a side elevation of the forward portion of an airplane embodying the present invention, and showing the planes secured in their rear position on the fuselage;

Fig. 2 is a corresponding view but showing the planes secured in their forward positions on the fuselage;

Fig. 3 is a top plan view of a portion of the airplane as shown in Fig. 2; and

Fig. 4 is a detail plan view of the connections between the fuselage anchorages and the connection members of a wing.

Referring more particularly to the drawings by reference numerals, 10 designates the fuselage of an airplane, having any suitable form of control aerofoils, landing gear 11, propeller 12 and engine 13, the construction preferably being such that the engine can be readily removed so that it may be replaced by another engine of different power.

In an aircraft adapted for carrying varying loads, or in training planes for example in which power plants of widely varying weights may be installed, the position of the center of gravity may vary considerably under different conditions. In accordance with the present invention the proper balance is maintained, and the plane arrangement is such as to be properly related to the engine weight or other variable weight factor by providing a plurality of positions of attachment of the sustaining planes.

The fuselage 10 comprises a skeleton frame 15 of welded tubes or the like, including lower longitudinals 16, upper longitudinals 17 and diagonally connected braces 18. Additional brace members 19 also form a part of the frame adjacent the wing locations as shown in Fig. 1.

At the points 21 and 22 on each side of the fuselage and preferably on the lower longitudinals 16 are two fixed anchorages 23, shown more in detail in Fig. 4. The lower sustaining planes or wings 24 are preferably provided with two spaced wing beams at the inner ends of which are secured the two connection members 26 and 27. The connection members 26 and 27 of each wing are adapted to be secured by pins or bolts 28 to the fixed fuselage anchorages 21 and 22 respectively, thus providing for the wing assembly in the fixed position shown in Fig. 1.

Each side of the fuselage frame is also provided with an additional pair of fixed anchorages at the points 31 and 32, these two points being spaced apart the same distance that obtains between points 21 and 22 so that the lower wings 24 may be either secured at the points 31 and 32 or at the points 21 and 22 dependent upon the desired location of the center of lift. As herein shown the two pairs of fixed anchorages at a side of the fuselage are relatively longitudinally displaced in the direction of the line of flight although it will be understood that relative displacements in any other desired relationship may be provided for, and additional anchorages or points of attachment may be employed.

While the invention is applicable to monoplane or multi-plane constructions, as herein shown the airplane is provided with an upper sustaining plane 33 having a center section 34 from the opposite sides of which extend the top plane sections 35. The outer ends of the planes 35 are interbraced to the lower wings by suitable struts 38, wires or the like 39 and 40 being provided to interbrace the wings and interconnect the wing with the center section. The center section 34 is secured in a desired position above the fuselage by means of detachable struts 42, 43 and 44 at each side of the fuselage, these struts being arranged in N formation as viewed from the side as indicated in Fig. 1. With the plane arrangement therein shown, struts 42, 43 and 44 are employed of the proper length so as to locate the upper wing the desired distance ahead of the lower wing. However, when the lower wing is attached to the anchorages 31 and 32 instead of to the rear anchorages, these struts are disconnected and replaced by struts 42', 43' and 44' of such length as to maintain the relative positions of the upper and lower wing surfaces unchanged, although they are all provided in a more forward position. The front crossed wires 46 which brace the outer section to the fuselage are also changed in length when the wing structure is repositioned.

It will thus be understood that the entire wing structure may be secured in a plurality of predetermined definite positions one of which is longitudinally displaced with respect to the other, on the fuselage. Thus in a primary training plane having a comparatively low power and light-weight engine the sustaining surfaces of the fuselage may be assembled in their rearmost position on the fuselage where the proper balance of the center of lift with respect to the other forces will be obtained. When the same airplane is converted to an advanced training plane, and the original power plant is replaced by a much heavier engine, it is a simple matter to remove the sustaining plane structure and secure it in a more forward position on the fuselage so as to properly locate the center of lift with respect to the center of gravity of the structure. The desired arrangement is accomplished without any substantial increase in weight, the construction being very simple and providing for fixed attachment of the wings with the essential strength factor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a fuselage, a sustaining plane therefor, a connection member on said plane, and a plurality of longitudinally spaced fixed anchorages on a lower portion of said fuselage adapted for selective attachment to said connection member for the fixed assembly of the plane in a plurality of different predetermined positions on the fuselage.

2. In an aircraft, a fuselage part and a sustaining plane part, a pair of longitudinally spaced connection members on one of said parts, and a plurality of pairs of connection members on the other of said parts each pair of which is longitudinally displaced from another pair thereof and each such pair being selectively adapted for connection with the pair of connection members first mentioned for the fixed assembly of the plane part in different selected positions with respect to the fuselage.

3. In an aircraft, a fuselage, a sustaining plane therefor, a pair of longitudinally spaced connection members at an end of said plane, and a plurality of pairs of correspondingly spaced fixed anchorages on said fuselage, one pair of fuselage anchorges being spaced longitudinally of the fuselage with respect to the other pair of fuselage anchorages, each pair of fuselage anchorages being adapted for selective attachment with the connection members of the plane for the support of the plane in a plurality of selected positions with respect to the fuselage.

4. In an aircraft, a fuselage, an upper sustaining plane, means connecting said plane to the fuselage, a lower sustaining plane, a plurality of connection members at the inner end of said lower plane, a first pair of fixed spaced anchorages on said fuselage adapted for attachment to said connection members for the support of the lower plane in one position, and a second pair of similarly spaced fixed anchorages on the fuselage displaced longitudinally with respect to the first pair of anchorages and also adapted for attachment to the connection members of the lower plane for supporting the plane in a second predetermined position on the fuselage.

5. In an aircraft, a fuselage, an upper sustaining plane, detachably connected struts connecting said plane to the fuselage, a pair of oppositely extending lower wings, means interbracing the wings to the upper sustaining plane, and cooperating means on the fuselage and on the inner ends of said lower wings providing for the support of said wings in a plurality of predetermined definite positions on the fuselage.

6. In an aircraft, a fuselage frame including angularly related connected frame members, a pair of longitudinally spaced fixed anchorages provided on each side of said frame and spaced apart a distance corresponding to the distance between the two beams of the lower sustaining planes, lower sustaining planes each having spaced wing beams with a connection member at the inner end of each wing beam adapted for connection to the fixed anchorages on the fuselage frame, and a second pair of fixed anchorages on each side of the frame and longitudinally displaced a fixed distance with regard to the pairs of fixed anchorages first mentioned and adapted for connection to the wing beam connection members, the various fixed anchorages on the fuselage frame being provided at the points of intersection of angularly related frame members.

JOSEPH M. GWINN, Jr.